United States Patent [19]

Epp et al.

[11] Patent Number: 5,836,480
[45] Date of Patent: Nov. 17, 1998

[54] STACKABLE HOPPER BOTTOM FOR STORAGE BIN

[76] Inventors: Richard E. Epp; Dwayne S. Epp, both of Box 64, Fiske, Canada

[21] Appl. No.: 824,240

[22] Filed: Mar. 25, 1997

[30] Foreign Application Priority Data

Nov. 4, 1996 [CA] Canada ................................... 2189476

[51] Int. Cl.⁶ ..................................................... B67D 5/60
[52] U.S. Cl. ........................ 222/143; 222/185.1; 222/460
[58] Field of Search .................................... 222/143, 180, 222/181.1, 181.2, 185.1, 460, 461, 556

[56] References Cited

U.S. PATENT DOCUMENTS

| | | | |
|---|---|---|---|
| 3,464,594 | 9/1969 | Forman | 222/143 |
| 3,602,400 | 8/1971 | Cooke | 222/143 |
| 3,776,435 | 12/1973 | Smith | 222/143 |
| 4,545,509 | 10/1985 | Musschoot et al. | 222/181.1 |
| 4,746,034 | 5/1988 | Ata et al. | 222/460 |
| 4,840,284 | 6/1989 | Snyder | 222/460 |
| 5,356,048 | 10/1994 | Geiser | 222/460 |

*Primary Examiner*—Joseph Kaufman
*Attorney, Agent, or Firm*—Adrian D. Battison; Murray E. Thrift

[57] ABSTRACT

A hopper bottom for supporting a grain bin includes a frustro conical hopper bottom wall with a discharge opening at a central base. Around the periphery of the wall is provided a plurality of vertical legs which support the wall above a horizontal support surface. The legs are formed square tubing with a hinge part way along the leg so as to divide the leg into an upper fixed stub portion and a lower pivotal main portion. The hinge is positioned inside the inside surface of the leg so that the main portion can fold to a position extending inwardly and downwardly. The hinge includes a pair of plates welded to the upper and lower ends of the main and stub portions. The plate at the bottom of the stub portion extends outwardly from the leg with a downturn flange at its outermost end so that the upper edge of the lower hopper bottom can engage against the underside of the outwardly projecting portion allowing the hopper bottom to be stacked for transportation while the legs remain attached to the hopper bottom but folded inwardly.

11 Claims, 3 Drawing Sheets

STACKABLE HOPPER BOTTOM FOR STORAGE BIN

BACKGROUND OF THE INVENTION

This invention relates to a hopper bottom for supporting a storage bin by which material stored in the bin can be discharged simply by gravity through a discharge opening in the hopper bottom.

The present invention is particularly but not exclusively concerned with storage bins for harvested crops in which the crops are generally stored in a cylindrical bin with a circular horizontal bottom end. Most such bins are simply mounted on a horizontal pad but this requires the operator of the bin to extract the material stored through one side wall which provides difficulty in the extraction, particularly of the material remaining at the bottom of the bin after the majority is extracted.

In recent years there has been a move therefore to mount the bins on a hopper bottom which comprises a generally conical wall section extending toward and inwardly from a circular outermost edge at the bottom of the bin to a base centrally of the bin and downwardly of the outer edge at which is provided a discharge opening with a suitable closure member for controlling the discharge. The hopper bottom is mounted a plurality of angularly spaced peripheral legs which extend vertically downwardly from a position at or adjacent the edge of the hopper bottom to the ground or other suitable support surface for supporting the hopper bottom and the bin relative to the ground.

In order to provide a reasonable storage capacity for the bin, the hopper bottom generally of a diameter of at least 15 feet and generally larger. One problem which arises therefore is the transportation of the hopper bottom from its manufacturing location to the intended location of the bin. Many of these bins are manufactured with the legs permanently attached by welding and therefore it is difficult or impossible to stack one hopper bottom on top of another hopper bottom. The transportation trailer is therefore limited to two such hopper bottoms arranged one in front of the other. Other manufacturers attempt to provide some stacking of the hopper bottom by providing legs which are supplied separately from the hopper bottom wall and are bolted in place when delivered. This technique provides some difficulties in that the assembly at the delivery site is more complicated and in that the legs are themselves difficult to transport.

While the manufacturing of the hopper bottoms themselves, therefore, is relatively straightforward, the delivery from the manufacturer's location to the delivery site has caused problems and significantly increases the cost of the finished product.

SUMMARY OF THE INVENTION

It is one object of the present invention to provide an improved hopper bottom which allows stacking of one hopper bottom on top of another for improved transportation and which provides ready assembly of the structure into a finished condition at the delivery site.

According to the invention, therefore, there is provided a hopper bottom for a storage bin comprising:

a generally conical hopper bottom wall having an outer edge and extending therefrom downwardly and inwardly toward a central base;

a discharge opening at the central base having a closure member for opening and closing the discharge opening whereby material stored in the bin can be discharged by gravity;

and a plurality of legs arranged at spaced positions around the hopper bottom wall for supporting the hopper bottom wall and the central base at a height spaced upwardly from a horizontal support surface;

each leg comprising a stub portion attached to the hopper bottom wall and extending downwardly therefrom and a lower main portion connected by a hinge to a bottom end of the stub portion for pivotal movement relative about a horizontal axis thereto between a first erected vertical position, in which the stub portion and the main portion lie along a common line, and a second folded position, in which the main portion extends from the bottom end of the stub portion inwardly and downwardly generally along an underside of the hopper bottom wall such that the hopper bottom can be stacked on top of a similar hopper bottom for transportation with the main portions of the legs folded between the underside of the hopper bottom wall and an upper side of the hopper bottom wall of the similar hopper bottom.

Preferably the legs are arranged at the outer edge of the hopper bottom wall.

Preferably the legs are formed from rectangular tubing with the hinge arranged along an inner straight side of the stub portion and main portion.

Preferably the hinge includes a pair of plates each attached to an end of a respective one of the stub portion and main portion such that the plates lie in contact and parallel in the first position and a hinge pin connecting the plates along an edge of the plates located relative to the stub and main portions inwardly toward the base.

Preferably the plates extend beyond the leg portions at least to one side thereof for connecting the plates by bolts to hold the leg portions in the first position.

Preferably the plate on the stub portion extends outwardly beyond the stub portion so as to provide a support portion for engaging the similar hopper bottom for supporting the hopper bottom relative to the similar hopper bottom.

Preferably the support portion includes a downwardly extending edge flange for locating the outer edge of the hopper bottom wall of the similar hopper bottom.

Preferably the plate on the main portion includes an outer edge which is located inwardly of the support portion.

Preferably the outer edge of the hopper bottom wall includes an upstanding flange and wherein the upstanding flange of the similar hopper bottom engages an undersurface of the support portion to provide support for the hopper bottom on the similar hopper bottom in the stacked position.

Preferably the plates extend beyond the leg portions at least to one side thereof different from the outer side and the inner side at which the hinge pin is located for connecting the plates by bolts to hold the leg portions in the first position.

One embodiment of the invention will now be described in conjunction with the accompanying drawings in which:

DESCRIPTION OF THE DRAWINGS

In the drawings like characters of reference indicate corresponding parts in the different figures.

DETAILED DESCRIPTION

Figure 1:
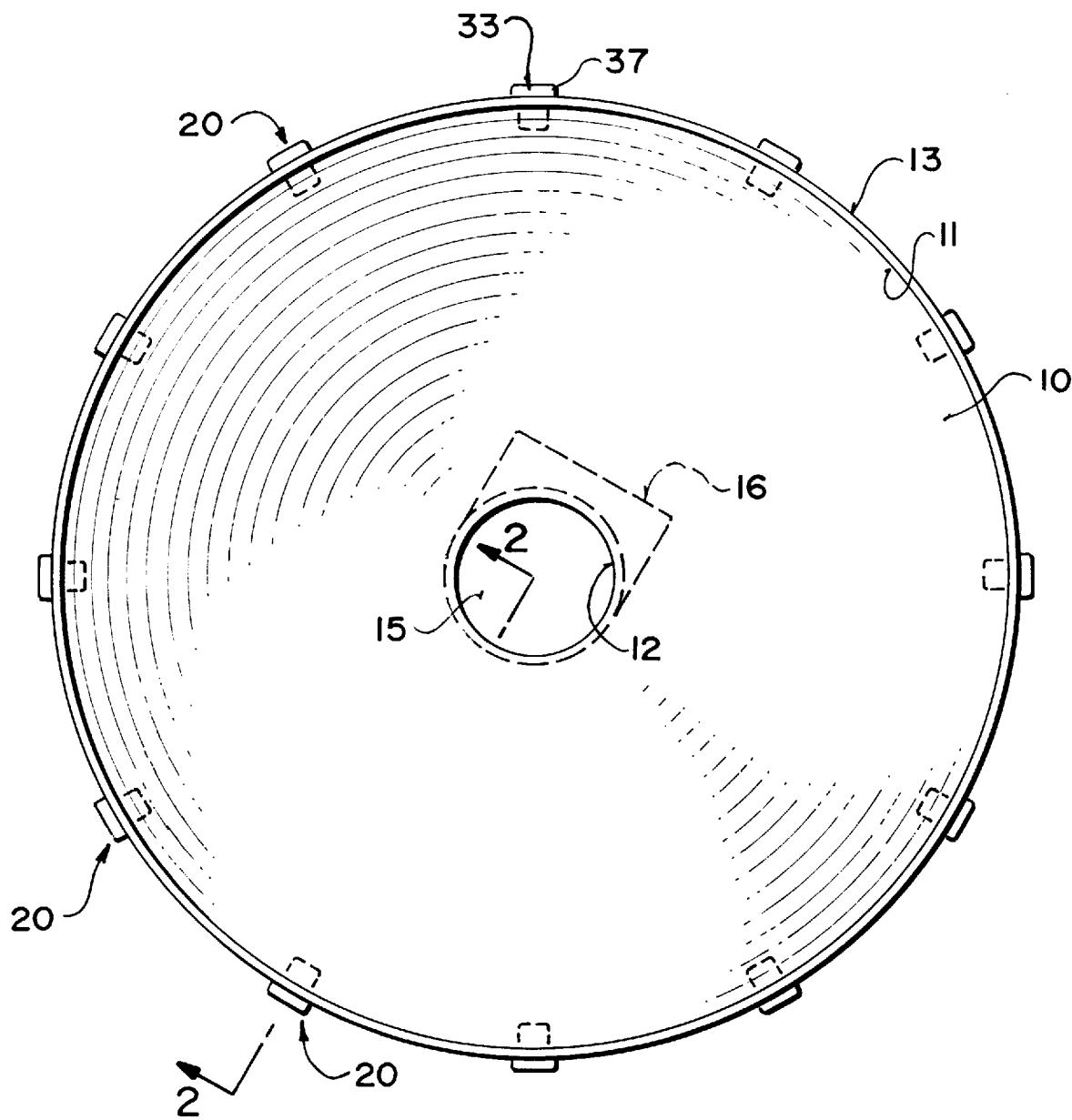
FIG. 1 is a top plan view of the hopper bottom according to the present invention.

In FIG. 1 is shown the hopper bottom of the present invention in top plan view, which includes a hopper bottom wall 10 which is frustro conical extending from an upper edge 11 to a base 12 which is central of the hopper bottom wall and is located downwardly and inwardly from the upper edge 11. The upper edge 11 is circular and includes a vertical flange 13 which is welded to the upper edge 11 with a portion of the flange extending upwardly from the edge 11 and a portion of the flange extending downwardly below the underside 14 of the hopper bottom wall 10.

The base 12 includes a discharge opening 15 with a closure member schematically indicated at 16 for opening and closing the discharge opening so that particulate material stored within a bin stacked on the hopper bottom can be discharged as required.

The simple conical construction of the hopper bottom wall is supported by a plurality of legs 20 located at spaced positions around the outer edge 11. In the embodiment shown the legs are located at the outer edge but it is possible that the legs can be spaced inwardly from the outer edge as required. Sufficient legs are provided that the hopper bottom can be supported without the necessity for cross braces.

Each leg comprises generally a square tube which has an upper end 21 welded to the underside 14 of the hopper bottom wall and to an inside surface 22 of the flange 13. At the bottom of the leg there is provided a foot pad 23 for resting upon a support surface 24.

In the present invention, the leg 20 is divided into an upper stub portion 30 and a lower main portion 31. Each of these portions is formed from square tube. The main portion is connected to the stub portion by a hinge section generally indicated at 32. The hinge section includes a first plate 33 which is welded to a bottom horizontal end 34 of the stub portion 30. The hinge includes a second plate 35 which is welded to a horizontal upper end 36 of the main portion 31. Both plate in plan view are larger than the cross section of the tube. Thus the plate 33 projects outwardly from the tube into an outward portion 37 and two side portions 38 and 39 all of which define plate portions extending outwardly beyond the tube to form a horizontal portion. The plate 33 also extends from the tube in an inward direction relative to the hopper bottom to form an edge portion 40. The plate 35 has an outward edge 35A which is located substantially immediately at the side wall of the tube. The plate 35 has side edges which are coextensive with the side edges of the plate 33 so as to form overlying portions of the plates 33 and 35 which can be bolted together through holes 42 using bolts 43. Along the inward edge of the plate 35A, the plate defines an inwardly projecting portion 35B with an upturn flange 35C. Between the edge portion 40 of a plate 33 on the upturn flange 35C is welded a hinge 44 including a hinge pin 45. The hinge 44 includes cylindrical hinge elements which are welded to either the edge portion 40 or to the flange 35C so the pin 45 passes through the hinge portions and allows a pivotal action of the plate 33 relative to the plate 35 about an axis defined by the pin 45.

Figure 2:
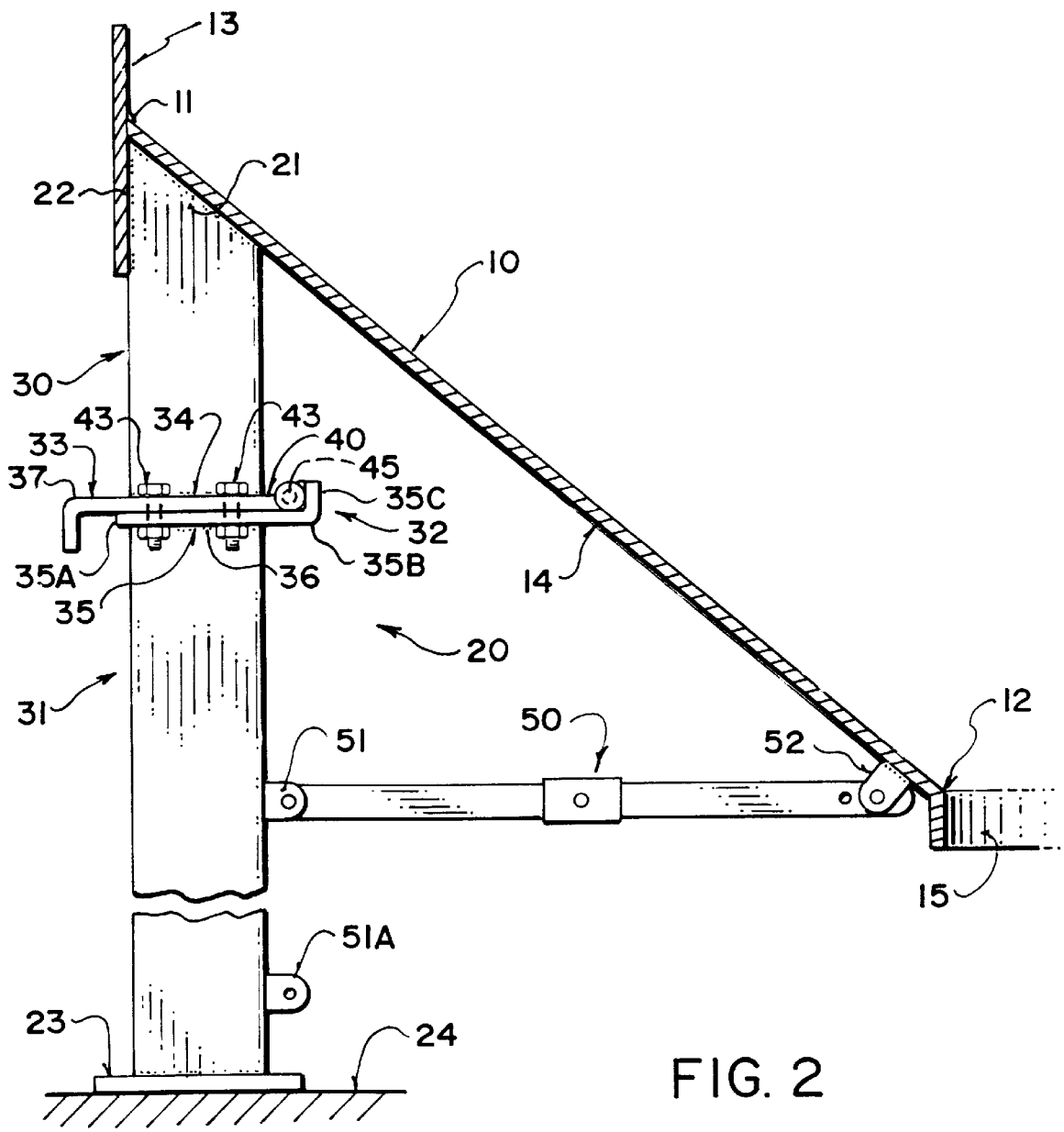
FIG. 2 is a view along the lines 2—2 of FIG. 1 on an enlarged scale and showing the hopper bottom in the assembled position.

In the first erected position shown in FIG. 2, the main leg portion 31 is pivoted to a position lying along the common line with the stub portion 30. In this position the plates are parallel and in contact so that the bolts 43 can be positioned through holes 42 to bolt the sides of the plates together and hold the leg in rigid condition. The leg is held in the erected position by a brace 50 which extends from a lug 51 on the leg to lug 52 on the hopper adjacent the bottom 12.

Figure 4:
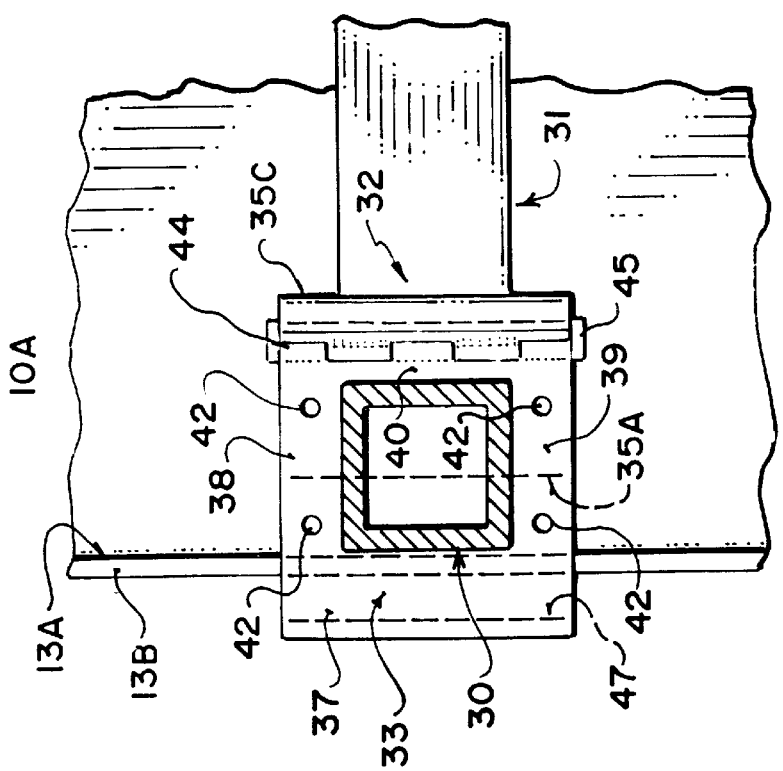
FIG. 4 is a cross-sectional view along lines 4—4 of FIG. 3.
Figure 3:
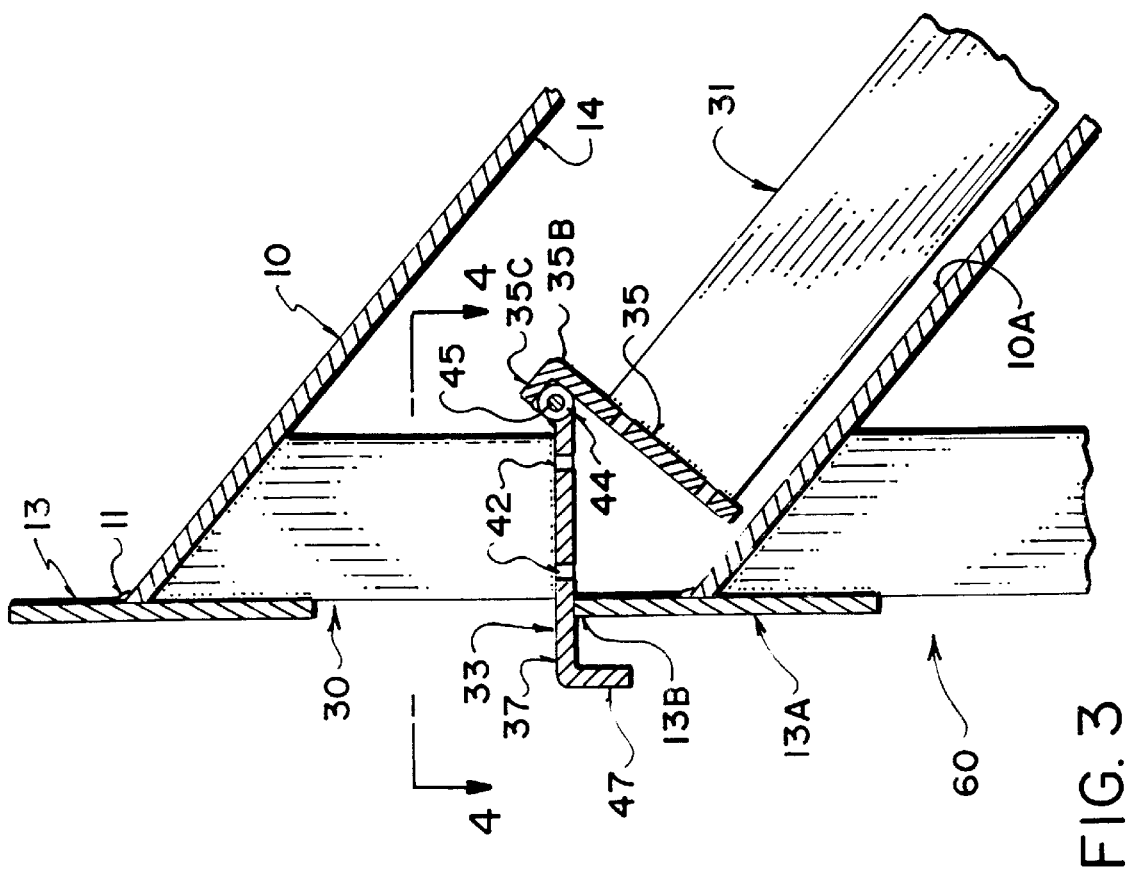
FIG. 3 is a similar view to that of FIG. 2 showing the hopper bottom with the leg in the folded position and stacked upon a second similar such hopper bottom.

In a disassembled transportation position shown in FIGS. 3 and 4, the bolts are removed and the main portion 31 is pivoted about the axis of the pin 45. In this position the leg extend downwardly and inwardly so that it takes a position lying substantially parallel to the wall 10. The leg is held in this position by the brace 50 which is connected between a lug 51A on the leg at the bottom end and the second lug 52 on the hopper adjacent the bottom 12. The brace has a length so that it holds the leg in the required place generally parallel to the bottom wall of the hopper. In order for the brace to hold the leg in both the erected position and the transport position, movement of the brace from the lug 51 to the lug 51A may be necessary and the brace may be adjustable in length by a sliding coupling arrangement.

A second similar hopper bottom generally indicated at 60 and including hopper bottom wall 10A and a flange 13A is located underneath the hopper bottom so that the top edge 13B of the flange 13A sits against an under surface of the portion 37 of the plate 33. A downturned flange 45 at an outermost edge of the portion 37 locates the edge 13B and prevents sideways movement of the hopper bottom relative to the supporting hopper bottom 60. The width of the portion 37 and the location of the flange 45 is such that the circular upper edge 13B can be readily received within the annular flange 45 with a small amount of side to side movement being available so that the stacking can be effective relatively quickly and without great accuracy. However the size of the portion 37 is sufficient to prevent any side to side movement of the hopper bottom when stacked.

It will be noted that the leg main portion 31 lies in the area between the hopper bottom walls 10 and 10a and can rest in position with the base pad 23 sitting on the upper surface of the hopper bottom wall 10A. The edge 35A of the plate 35 is at or closely adjacent the outside surface of the leg main portion 31 so that there is no interference with the upper surface of the wall 10A.

Several hopper bottoms can be stacked one on top of the next with the lower most one of the hopper bottoms having the legs in the erected position to hold the whole stacked structure in stable condition. The legs are attached to the hopper bottom so that when arriving at the delivery site there is no necessity to locate separate elements apart from the bolts 43 which are of course standard and readily available.

Since various modifications can be made in my invention as herein above described, and many apparently widely different embodiments of same made within the spirit and scope of the claims without departing from such spirit and scope, it is intended that all matter contained in the accompanying specification shall be interpreted as illustrative only and not in a limiting sense.

We claim:

1. A hopper bottom for a storage bin comprising:
   a generally conical hopper bottom wall having an outer edge and extending therefrom downwardly and inwardly toward a central base;
   a discharge opening at the central base having a closure member for opening and closing the discharge opening whereby material stored in the bin can be discharged by gravity;
   and a plurality of legs arranged at spaced positions around the hopper bottom wall for supporting the hopper bottom wall and the central base at a height spaced upwardly from a horizontal support surface;
   each leg comprising a stub portion attached to the hopper bottom wall and extending downwardly therefrom and a lower main portion connected by a hinge to a bottom end of the stub portion for pivotal movement relative about a horizontal axis thereto between a first erected vertical position, in which the stub portion and the main portion lie along a common line, and a second folded position, in which the main portion extends from the bottom end of the stub portion inwardly and downwardly generally along an underside of the hopper bottom wall such that the hopper bottom can be stacked on top of a similar hopper bottom for transportation with the main portions of the legs folded between the underside of the hopper bottom wall and an upper side of the hopper bottom wall of the similar hopper bottom.

2. The hopper bottom according to claim 1 wherein the legs are arranged at the outer edge of the hopper bottom wall.

3. The hopper bottom according to claim 1 wherein the legs are formed from rectangular tubing with the hinge arranged along an inner straight side of the stub portion and main portion.

4. The hopper bottom according to claim 1 wherein the hinge includes a pair of plates each attached to an end of a respective one of the stub portion and main portion such that the plates lie in contact and parallel in the first position and a hinge pin connecting the plates along an edge of the plates located relative to the stub and main portions inwardly toward the base.

5. The hopper bottom according to claim 4 wherein the plates extend beyond the leg portions at least to one side thereof for connecting the plates by bolts to hold the leg portions in the first position.

6. The hopper bottom according to claim 4 wherein the plate on the stub portion extends outwardly beyond the stub portion so as to provide a support portion for engaging the similar hopper bottom for supporting the hopper bottom relative to the similar hopper bottom.

7. The hopper bottom according to claim 6 wherein the support portion includes a downwardly extending edge flange for locating the outer edge of the hopper bottom wall of the similar hopper bottom.

8. The hopper bottom according to claim 6 wherein the plate on the main portion includes an outer edge which is located inwardly of the support portion.

9. The hopper bottom according to claim 6 wherein the outer edge of the hopper bottom wall includes an upstanding flange and wherein the upstanding flange of the similar hopper bottom engages an undersurface of the support portion to provide support for the hopper bottom on the similar hopper bottom in the stacked position.

10. The hopper bottom according to claim 6 wherein the plates extend beyond the leg portions at least to one side thereof different from the outer side and the inner side at which the hinge pin is located for connecting the plates by bolts to hold the leg portions in the first position.

11. The hopper bottom according to claim 1 wherein the leg includes a brace which can be adjusted to hold the leg in the erected position and in the folded position.

* * * * *